Oct. 27, 1925.

J. SLEPIAN 1,558,937

DYNAMO ELECTRIC MACHINE

Filed Aug. 15, 1919

WITNESSES:
H.J.Shelhamer
D.C.Davis

INVENTOR
Joseph Slepian
BY
Wesley G. Carr
ATTORNEY

Patented Oct. 27, 1925.

1,558,937

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

Application filed August 15, 1919. Serial No. 317,690.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Dynamo-Electric Machines, of which the following is a specification.

My invention relates to means for producing wattless electric currents, and it has for its object to provide apparatus of the character designated that shall be simple, rugged and inexpensive in construction and extremely flexible and effective in operation.

Figure 1:
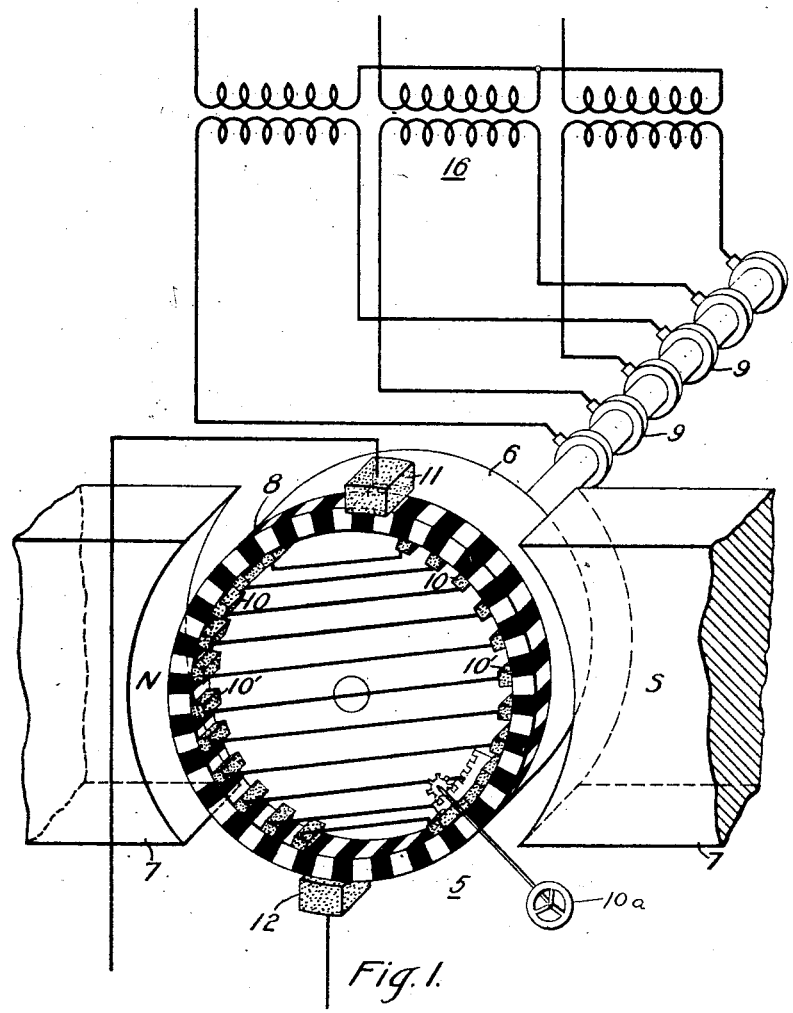
Figure 2:
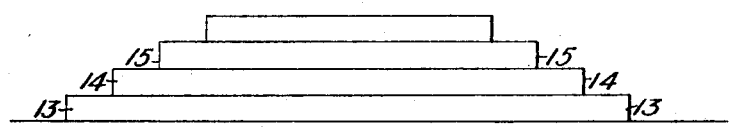

Fig. 1 of the accompanying drawing is a diagrammatic perspective view of a dynamo-electric machine embodying my invention; and Fig. 2 is a diagram indicating the manner in which the flow of direct current in separate paths in the machine of Fig. 1 builds up to produce a close approximation to a sine wave.

In the production of wattless currents, as for the modification of the power-factor in an electrical system, it is well known to employ synchronous machines, these machines being connected to the system and being overexcited for the production of leading currents and under-excited for the production of lagging currents.

In accordance with the present invention, I employ a synchronous machine, in general resembling a rotary converter, for the production of wattless currents, the commutator segments of this machine being interconnected in such a manner as to form closed paths through the armature winding and the commutator structure. By suitable adjustment of the commutator-interconnected means, the phase of these circulating currents may be adjusted and, consequently, the corrective effect of the machine.

While this machine is contemplated primarily as a source of wattless currents, nevertheless, it may be employed simultaneously as a rotary converter or as a synchronous motor, in the usual manner.

Referring to the drawing for a more detailed understanding of my invention, I show a dynamo-electric machine at 5, this machine comprising a rotatable armature 6 and an appropriate field system indicated by field poles 7—7. The entire structure of the machine 5 is similar to that of the usual rotary converter in that the armature 6 is provided with a commutator 8 and with slip rings 9, these current-transferring devices being connected to the armature winding exactly as in the ordinary rotary converter.

The conducting segments of the commutator 8 are preferably somewhat widely separated by insulating segments, as shown, for a purpose to hereinafter more fully appear. Appropriately disposed brush pairs, such as 10—10 and 10'—10' are interconnected, these brushes lying along axes more or less approaching alinement with the magnetic axis determined by the poles 7—7. These brushes 10—10 and 10'—10' are preferably of less width than the conducting segments of the commutator 8 and of the insulating segments therebetween so that the brushes, at no time, span adjacent commutator segments. The machine may, furthermore, be provided with main brushes 11 and 12, as in the ordinary rotary converter, if desired. The slip rings 9 are connected to supply transformers 16 in a manner similar to that ordinarily employed with rotary converters. The brushes 10—10, 10'—10' may be shifted about the axis of the armature 6, if desired, by any suitable mechanism 10a.

Having thus described the arrangement of a system embodying my invention, the operation thereof is as follows.

If the brush pairs 10—10, 10'—10' that are interconnected lie along the magnetic axis determined by the poles 7—7, it is obvious that they interconnect points of like potential and thus, no current flow takes place through the interconnecting leads. If all the brushes 10—10, 10'—10' be slightly shifted as, for example, in a counter-clockwise position, they serve to interconnect points of slightly different potential, and circulating currents flow through the secondary windings of the transformers and through the slip rings 9. The circulating currents, being substantially without voltage, are, therefore, substantially wattless in nature. If the brushes 10—10, 10'—10' are shifted in one direction, these circulating currents are reflected back into the system as leading currents, whereas, if the brushes are shifted in the other direction, the circulating currents are reflected back into the system as lagging currents. Thus, by the direction and degree of shift, the power-factor-modifying function of the machine 5 may be adjusted at will.

Turning now to the conditions obtaining in commutation, it should be noted that the alternating currents flowing into the armature are substantially neutralized by the circulating currents flowing through the commutator 8, in so far as commutation is concerned, as will appear from the following considerations. Brushes 10—10, 10'—10', separated by substantially a complete diameter, have a considerable difference of potential therebetween and, therefore, establish a relatively large current flow, as indicated by the rectangle 13—13 in Fig. 2. As the interconnected brush pairs lie successively nearer and nearer the main brush positions, the circulating currents set up therethrough are less and less, as indicated by the rectangles 14—14, 15—15, etc. All these rectangles add up to give a total flow of current approximating a sine wave and, obviously, as the number of short-circuiting brushes is increased, the approximation to a sine wave also increases. This flow of short-circuit current is opposed to the flow of alternating current, in so far as commutation is concerned, and thus current neutralization is effected in the armature as in the ordinary converter. Obviously, the short-circuited brushes 10—10 have but little effect upon the electromotive force across the armature between the normal commutating zones and thus, if desired, the main brushes 11 and 12 may be applied to the machine so that direct currents of any desired voltage may be taken off, as in the ordinary rotary converter, or the machine may be driven as a synchronous generator, if desired.

While I have shown my invention in its preferred form, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. In a dynamo-electric machine of the synchronous type, the combination with an armature provided with a commutator and with slip rings connected to a winding thereof, of a field system embracing said armature, means for supplying alternating currents to said slip rings, and brush short-circuiting means for short-circuiting said commutator in an axis inclined at an angle with respect to the normal commutating axis.

2. In a dynamo-electric machine of the synchronous type, the combination with an armature provided with a commutator member and with slip rings connected to the winding thereof, of means for supplying alternating currents to said slip rings, means for deriving direct currents from said commutator member, a field system embracing said armature, a plurality of pairs of auxiliary brushes on said commutator member, and means for interconnecting the brushes in each pair through a conducting path of negligible impedance.

3. Means for producing wattless current flow in an alternating-current system comprising means for producing a series of unidirectional current waves and reflecting said waves into said alternating-current system in such time-phase relationship as to produce the desired wattless current effect.

4. In a dynamo-electric machine of the synchronous type, the combination with an armature provided with commutating segments and slip rings connected to a winding thereof as in a rotary converter, of means for supplying alternating currents to said slip rings, a plurality of brushes bearing on said commutator segments, means for interconnecting brushes of almost but not quite the same potential through conducting paths of negligible impedance and a field system embracing said armature, the axes of said interconnections being shifted with respect to the axes which would give the same potentials in the interconnected brushes, and means for adjusting said axes during the operation of the machine.

5. In a dynamo-electric machine of the synchronous type, the combination with an armature provided with a commutator member and with slip rings connected to the winding thereof, of means for supplying alternating currents to said slip rings, means for deriving direct currents from said commutator member, a field system embracing said armature, a plurality of auxiliary brushes on said commutator member, and means for interconnecting pairs of said auxiliary brushes through conducting paths of negligible impedance, said auxiliary brushes being adjustable circumferentially of the commutator member whereby the phase and magnitude of the wattless current effect reflected into the alternating current supply may be modified.

In testimony whereof, I have hereunto subscribed my name this 30th day of July 1919.

JOSEPH SLEPIAN.